United States Patent
Byun et al.

(10) Patent No.: US 10,624,132 B2
(45) Date of Patent: Apr. 14, 2020

(54) METHOD AND APPARATUS FOR TRANSMITTING UPLINK DATA IN WIRELESS COMMUNICATION SYSTEM

(71) Applicant: LG Electronics Inc., Seoul (KR)

(72) Inventors: Ilmu Byun, Seoul (KR); Kijun Kim, Seoul (KR); Jiwon Kang, Seoul (KR); Eunsun Kim, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/095,577

(22) PCT Filed: Apr. 12, 2017

(86) PCT No.: PCT/KR2017/003948
§ 371 (c)(1),
(2) Date: Oct. 22, 2018

(87) PCT Pub. No.: WO2017/183848
PCT Pub. Date: Oct. 26, 2017

(65) Prior Publication Data
US 2019/0132880 A1 May 2, 2019

Related U.S. Application Data

(60) Provisional application No. 62/325,464, filed on Apr. 21, 2016.

(30) Foreign Application Priority Data

Dec. 21, 2016 (EP) ................................ 16205780

(51) Int. Cl.
*H04W 74/08* (2009.01)
*H04B 7/0408* (2017.01)
(Continued)

(52) U.S. Cl.
CPC ...... *H04W 74/0833* (2013.01); *H04B 7/0408* (2013.01); *H04B 7/0413* (2013.01);
(Continued)

(58) Field of Classification Search
None
See application file for complete search history.

(56) References Cited

U.S. PATENT DOCUMENTS 10,420,066 B2 * 9/2019 Sadeghi .................. H04L 5/005
2005/0073976 A1 4/2005 Fujii
(Continued)

FOREIGN PATENT DOCUMENTS

CA 2943697 10/2015

OTHER PUBLICATIONS

European Extended Search Report in European Application No. 16205780.6, dated Mar. 3, 2017, 16 pages.
(Continued)

*Primary Examiner* — Diane L Lo
(74) *Attorney, Agent, or Firm* — Fish & Richardson P.C.

(57) ABSTRACT

Provided is a method of transmitting, by a first user equipment, uplink data in a wireless communication. The method includes transmitting a random access preamble to a base station through an optimal beam of the first user equipment, receiving a first random access response and a second random access response wherein the first random access response is received together with downlink data of a second user equipment through an optimal beam of the second user equipment at a first point of time and the second random access response is received together with downlink data of a third user equipment through an optimal beam of the third user equipment at a second point of time, decoding a message which is generated by combining the first random access response with the second random access response, and transmitting the uplink data to the base station based on scheduling information included in the message.

13 Claims, 12 Drawing Sheets

(51) Int. Cl.
 H04B 7/06 (2006.01)
 H04W 74/00 (2009.01)
 H04B 7/0413 (2017.01)
 H04L 5/00 (2006.01)
 H04W 72/04 (2009.01)
 H04W 56/00 (2009.01)
(52) U.S. Cl.
 CPC ......... *H04B 7/0617* (2013.01); *H04B 7/0695* (2013.01); *H04L 5/0048* (2013.01); *H04W 72/046* (2013.01); *H04W 72/0446* (2013.01); *H04W 74/008* (2013.01); *H04L 5/0007* (2013.01); *H04W 56/0015* (2013.01)

(56) References Cited

U.S. PATENT DOCUMENTS

| | | | | |
|---|---|---|---|---|
| 2008/0273610 | A1* | 11/2008 | Malladi | H04L 1/0029 375/260 |
| 2011/0170503 | A1* | 7/2011 | Chun | H04W 74/006 370/329 |
| 2011/0243075 | A1* | 10/2011 | Luo | H04W 74/004 370/329 |
| 2014/0126520 | A1 | 5/2014 | Quan et al. | |
| 2014/0376466 | A1 | 12/2014 | Jeong et al. | |
| 2015/0146668 | A1* | 5/2015 | Liu | H04L 5/0051 370/329 |
| 2016/0157267 | A1* | 6/2016 | Frenne | H04W 74/008 370/329 |
| 2017/0251460 | A1* | 8/2017 | Agiwal | H04W 72/0406 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 13)," 3GPP TS 36.321 V13.1.0, dated Mar. 2016, 87 pages.

Samsung, "MIMO/beamforming for 5G new radio interface for over-6GHz: system architecture and design aspects," 3GPP TSG RAN WG1 #84bis, dated Apr. 11-15, 2016, 9 pages.

* cited by examiner

[Fig. 1]
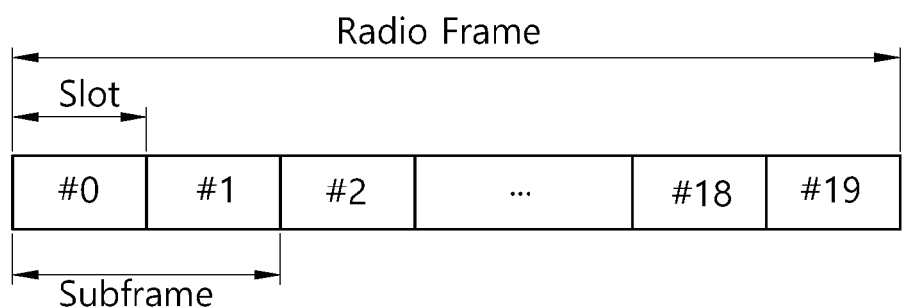

[Fig. 2]
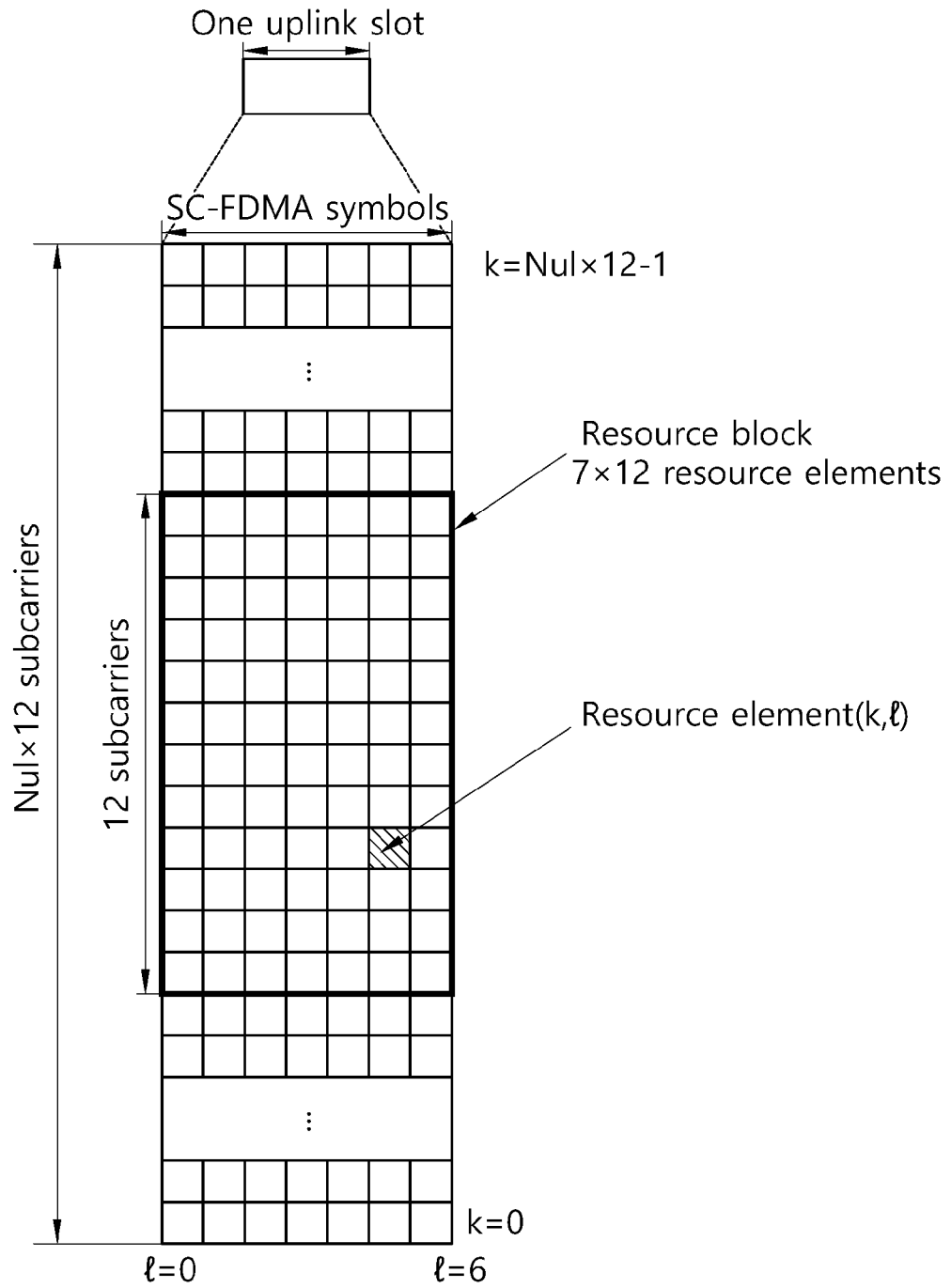

[Fig. 3]
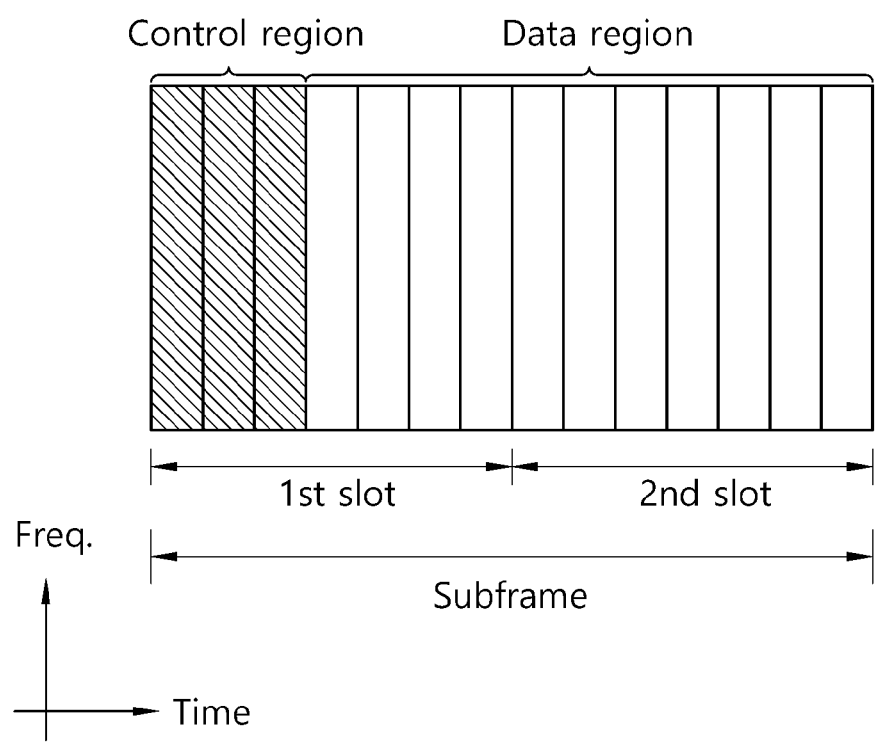

[Fig. 4]
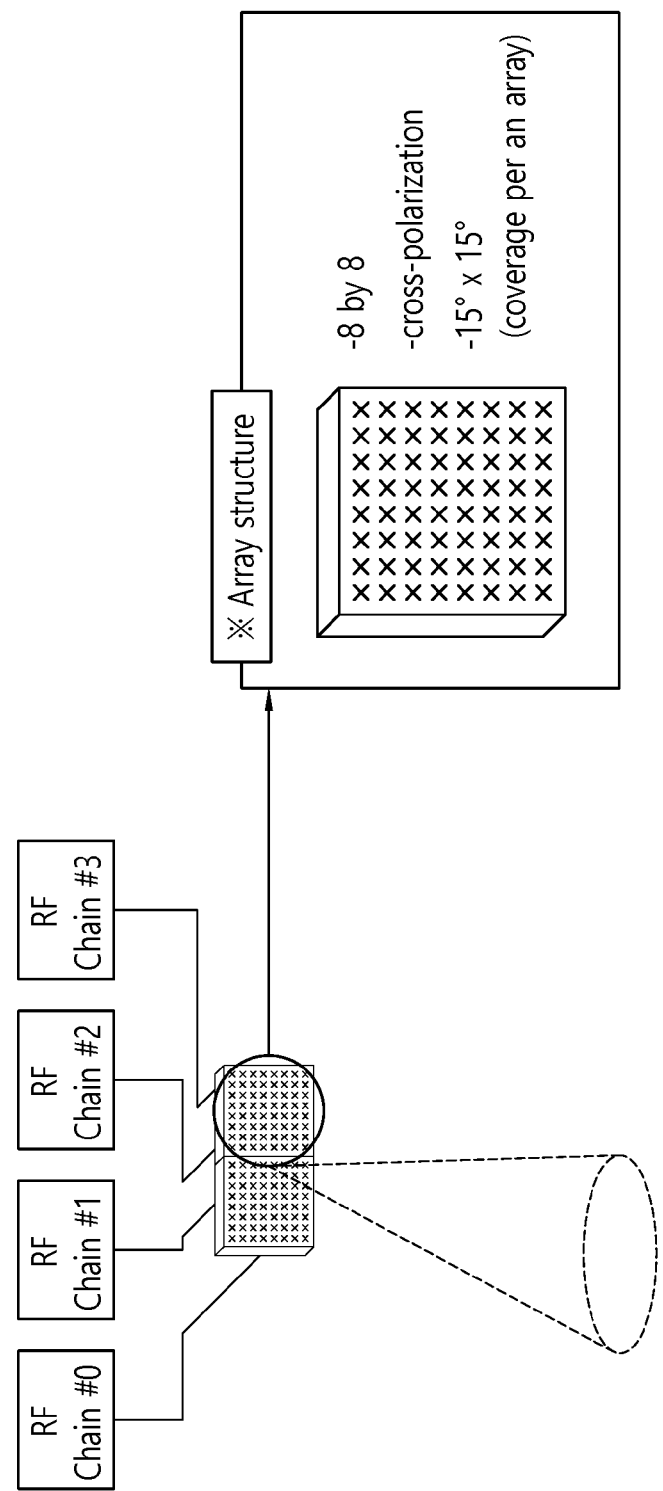

[Fig. 5]
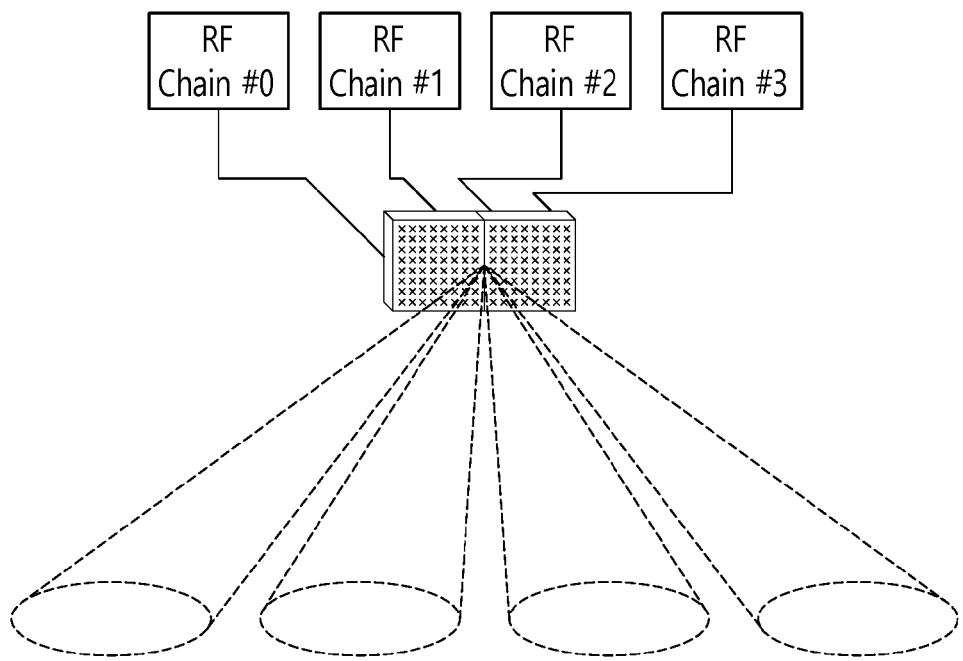

[Fig. 6]
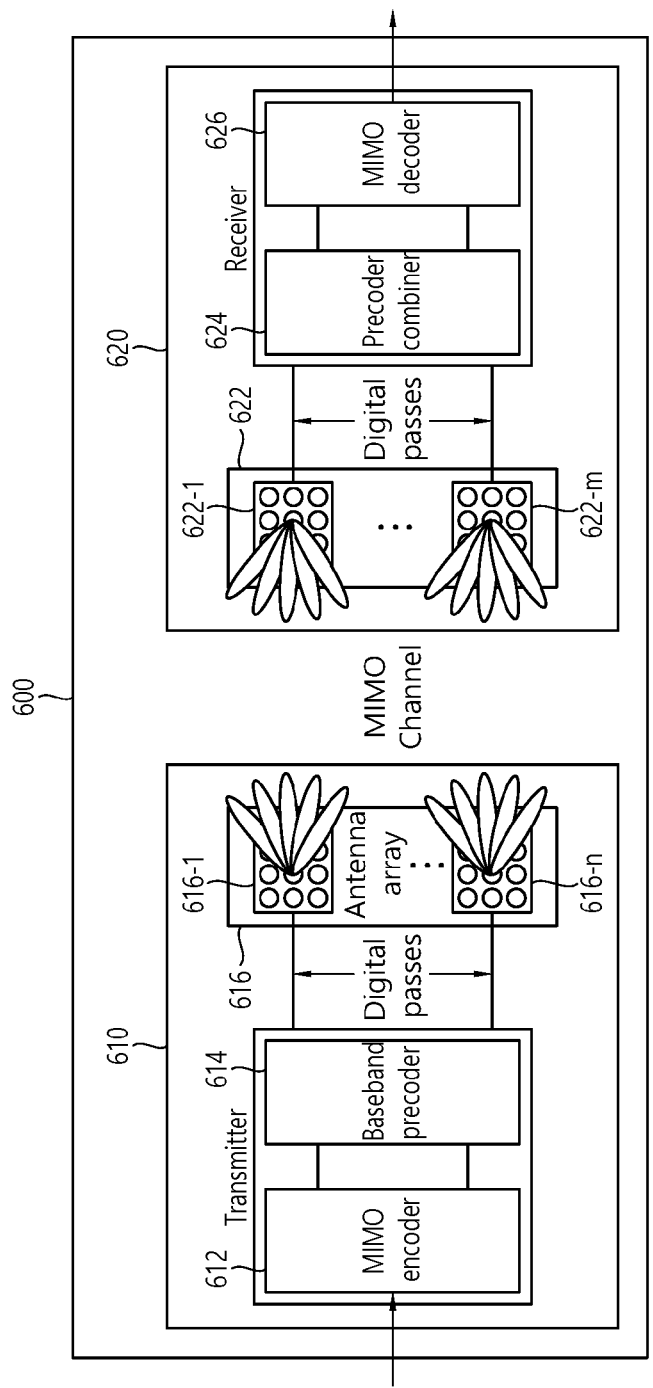

[Fig. 7]
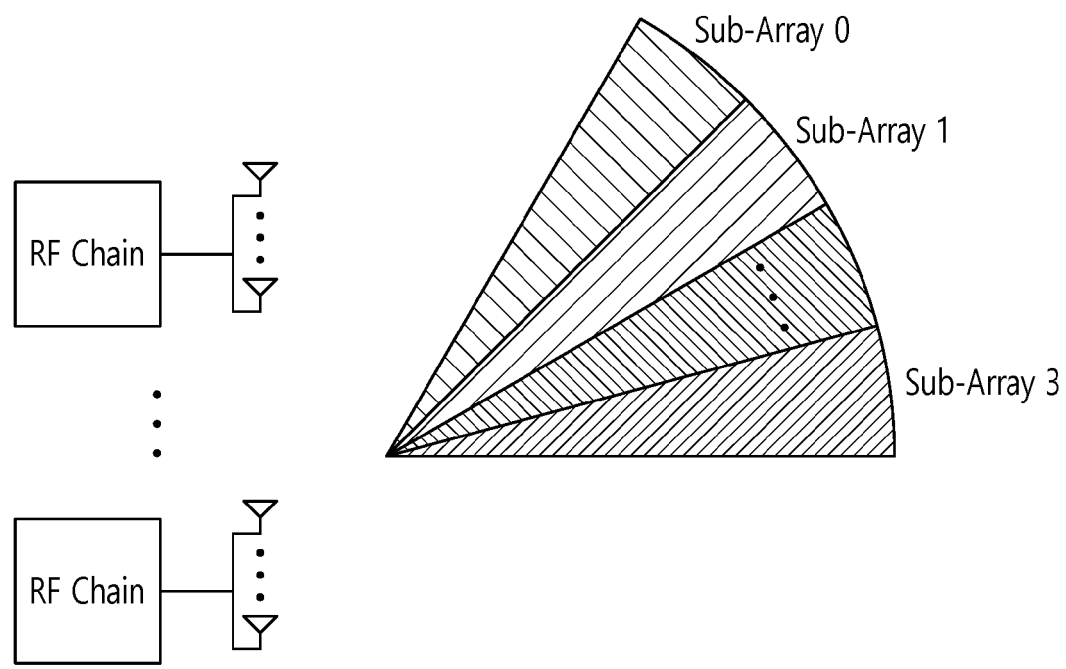

[Fig. 8]
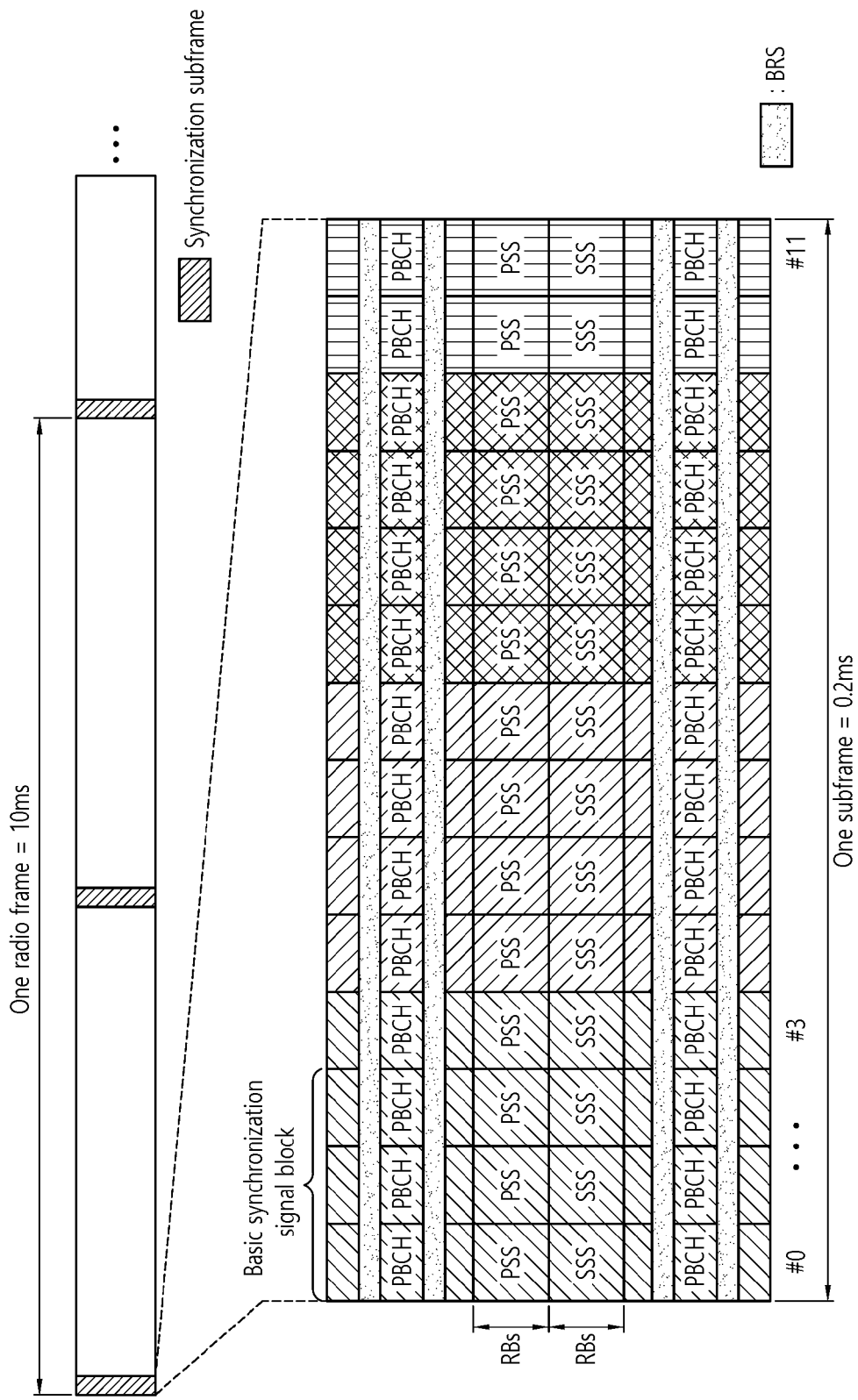

[Fig. 9]
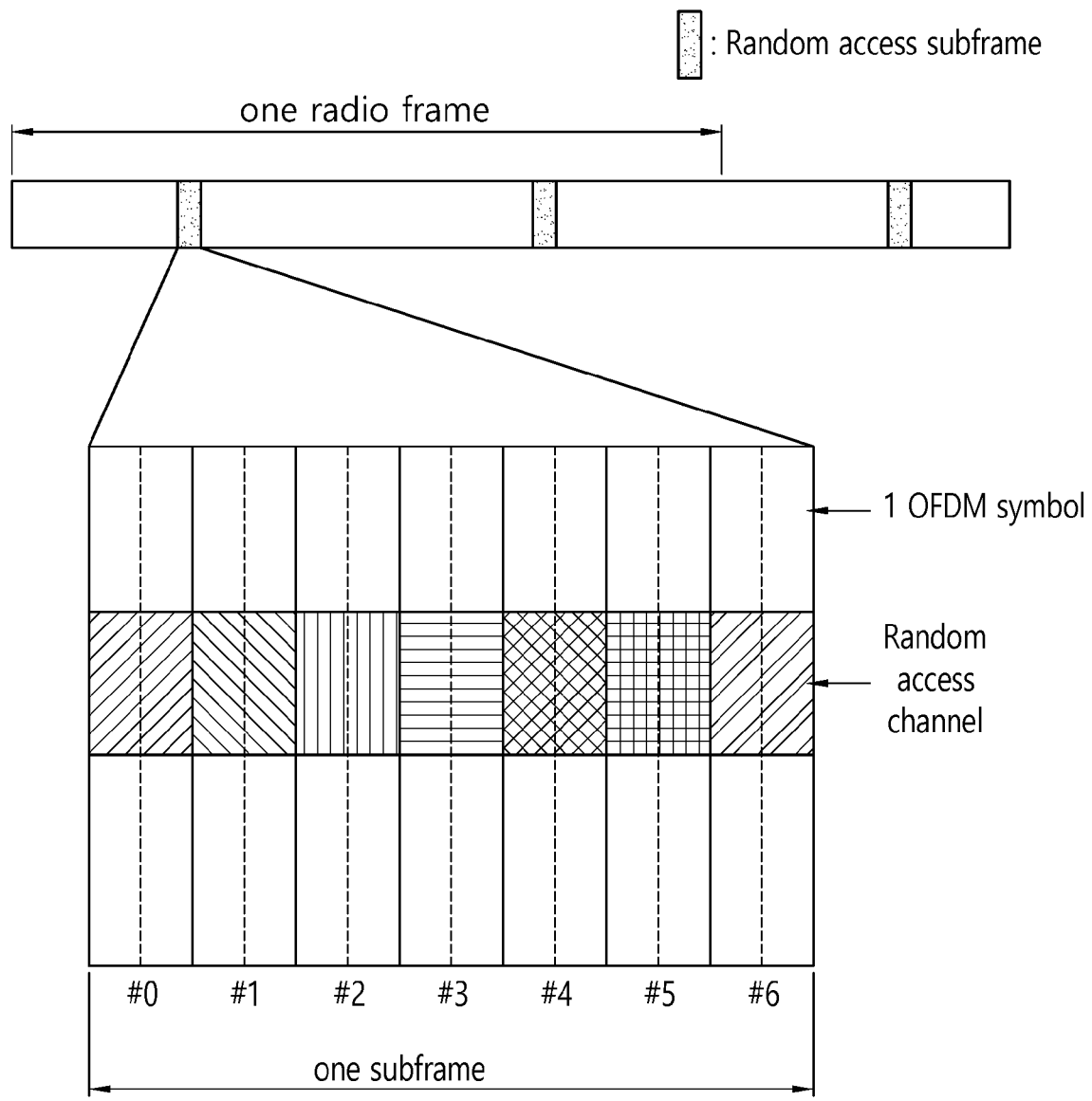

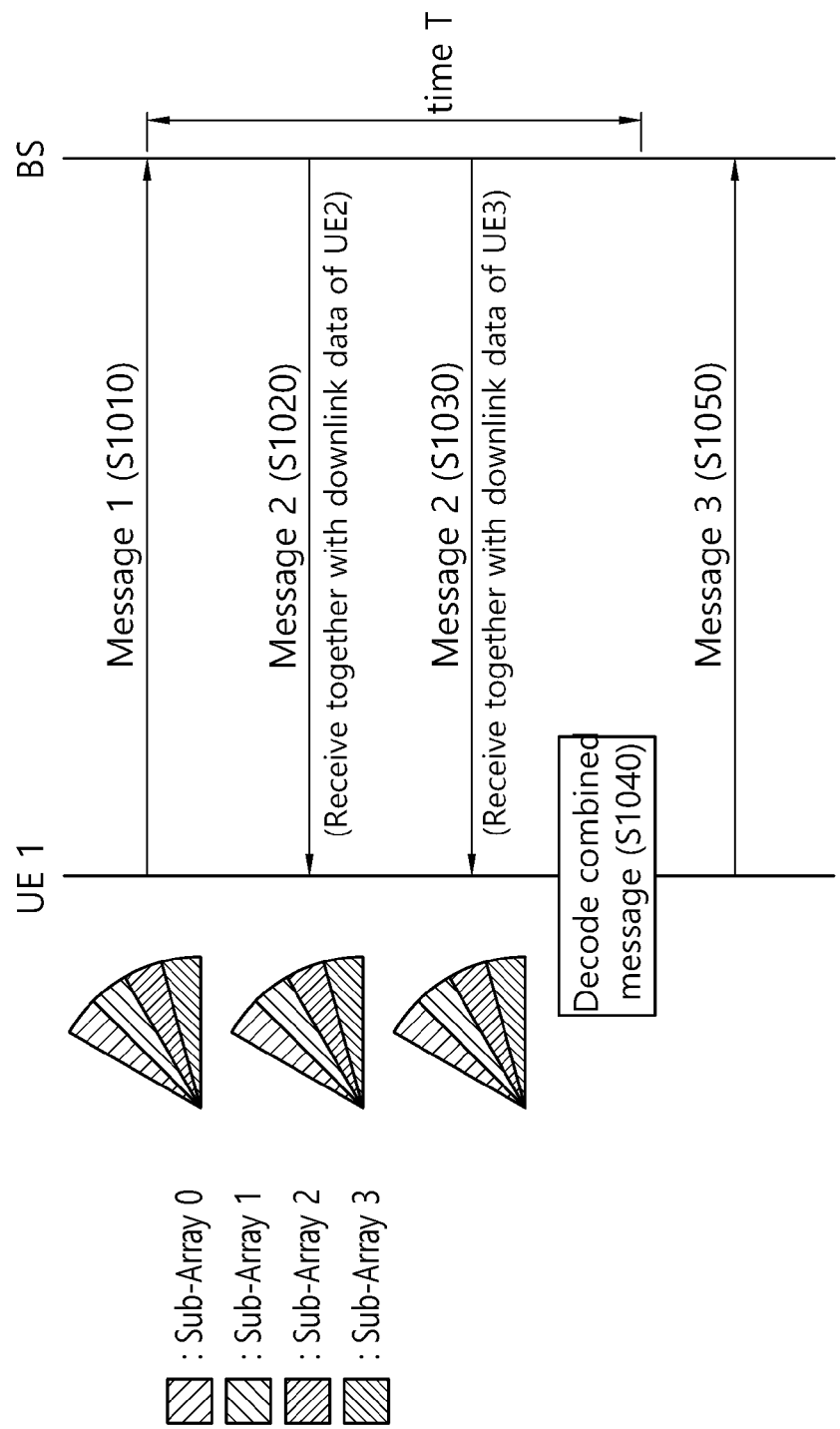
[Fig. 10]

[Fig. 11]
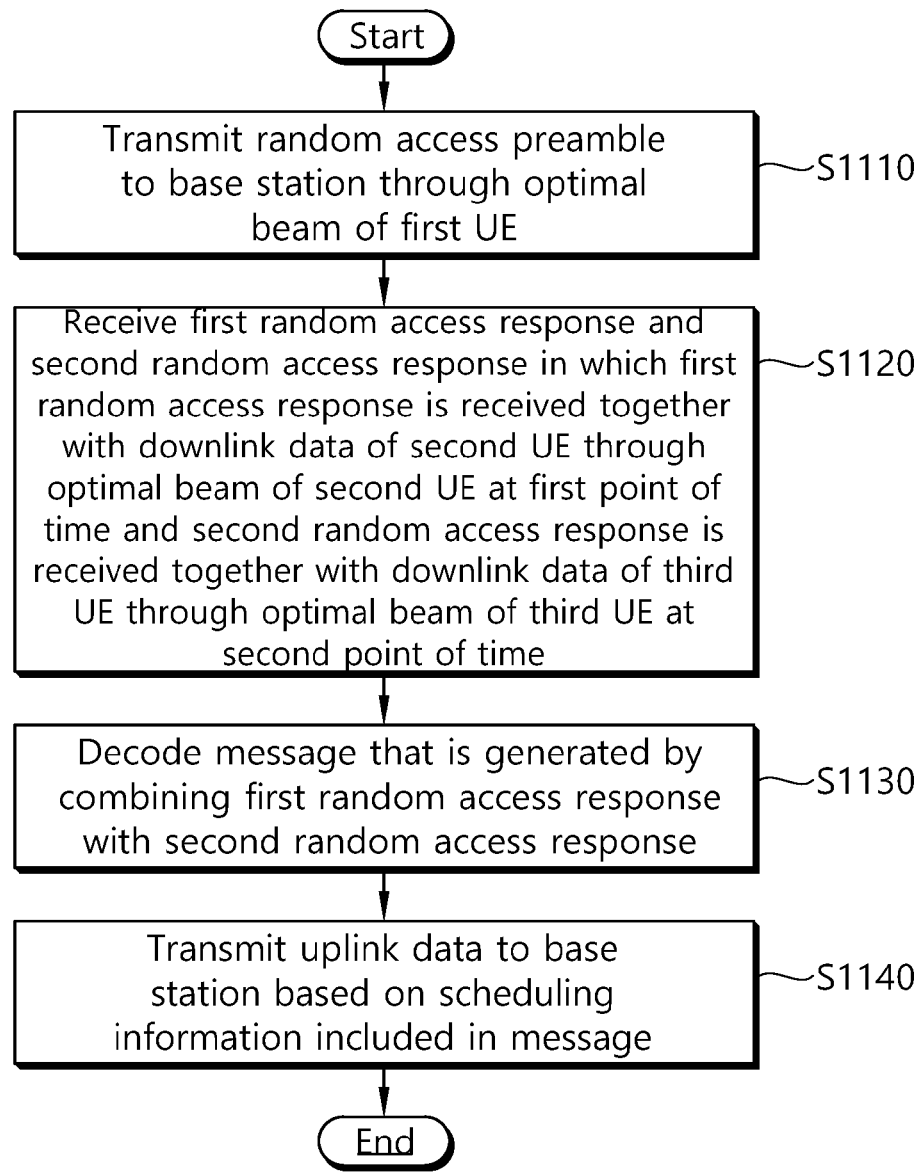

[Fig. 12]
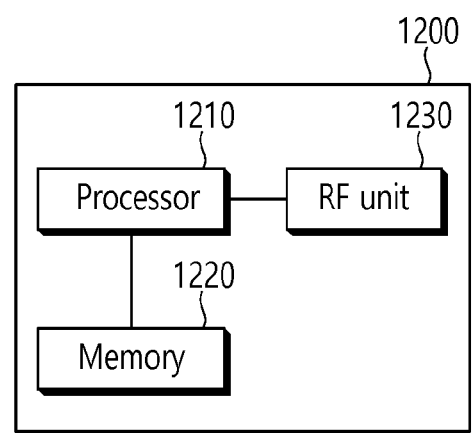

METHOD AND APPARATUS FOR TRANSMITTING UPLINK DATA IN WIRELESS COMMUNICATION SYSTEM

CROSS-REFERENCE TO RELATED APPLICATIONS

This application is a National Stage application under 35 U.S.C. § 371 of International Application No. PCT/KR2017/003948, filed on Apr. 12, 2017, which claims the benefit of EP Application No. 16205780.6, filed on Dec. 21, 2016, and U.S. Provisional Application No. 62/325,464, filed on Apr. 21, 2016. The disclosures of the prior applications are incorporated by reference in their entirety.

TECHNICAL FIELD

The present invention relates to wireless communication and, more particularly, to a method and apparatus for transmitting uplink data in a wireless communication system.

BACKGROUND ART

In order to satisfy continually increasing wireless data traffic demands in a wireless communication system, solutions for supporting a higher data transmission rate have been studied. One of the solutions is to use a beamforming-based base station which utilizes a wide frequency band in a millimeter wave (mmWave) band, thereby significantly enhancing the capacity of a cellular system.

Meanwhile, in order to transmit a multitude of informations to a single user or a multi-user, a MIMO (Multiple Input Multiple Output) system, which is considered in the existing standards such as LTE (Long Term Evolution)-Advanced, has a plurality of digital paths or RF (Radio Frequency) chains. When MIMO communication is performed using such digital paths, the performance gains such as a diversity gain and a multiplexing gain may be obtained. However, when the number of digital paths is increased to obtain a greater gain, problems such as synchronization between digital paths, costs, and operation complexity may be generated.

In a millimeter wave band system, the disadvantage of path attenuation may be offset through the beamforming gain by using a large number of physical antennas. However, the digital beamforming scheme in the existing MIMO system needs one RF chain for one physical antenna, and thus a large number of RF chains are needed. This causes problems such as costs and operation complexity. Hence, in order to perform efficient communication in the millimeter wave band, a hybrid beamforming system, which simultaneously uses a digital beamforming and an analog beamforming, may be considered. The analog beamforming may connect a plurality of physical antennas in one RF chain as an array and may form a narrow beam using a phase shifter. Compared to the digital beamforming, the analog beamforming is poor in aspect of the sharpness of the beam and flexibility of direction adjustment, but the analog beamforming does not increase the number of digital paths, thereby having low implementation costs and low complexity. In order to efficiently obtain a high communication capacity in a millimeter wave band, a hybrid beamforming system, in which advantages and disadvantages of the digital beamforming and the analog beamforming are appropriately combined, may be considered.

DISCLOSURE OF INVENTION

Technical Problem

The present invention provides a method and apparatus for transmitting uplink data in a wireless communication system.

Solution to Problem

In an aspect, a method of transmitting, by a first user equipment (UE), uplink data in a wireless communication is provided.

First, with respect to terms, the optimal beam of a UE may correspond to a sub-array beam or analog beam which is appropriate for the UE.

First, a first UE transmits a random access preamble to the base station through the optimal beam of the first UE.

The first UE receives a first random access response and a second random access response. The first random access response is received together with the downlink data of the second UE through the optimal beam of the second UE at the first point of time. The second random access response is received together with the downlink data of the third UE through the optimal beam of the third UE at the second point of time.

The first UE decodes a message which is generated by combining the first random access response with the second random access response.

The first point of time and the second point of time may be the same point of time or different points of time. If the first point of time and the second point of time are the same, the first random access response and the second random access response may correspond to different sub-arrays. When the first point of time and the second point of time are different from each other, the first point of time and the second point of time may correspond to each subframe. Namely, the first UE may receive the random access response twice at different points of time and combine the received random access responses so as to be decoded. There are not many contents in the random access response, and thus if the random access response is transmitted to the entire band for the corresponding beam, resources may be wasted. Hence, the first UE does not receive the random access response as the optimal beam of the first UE. Rather, the first UE may receive the random access response together with the downlink data of another UE (yet, it is assumed that they are beams adjacent to each other) by dividing the frequency band. The first UE receives the random access response several times in order to reinforce the signal-weakened random access response because the random access response is not received as the optimal beam of the first UE. Namely, the first UE receives the random access response until the receiving SNR becomes sufficient.

Namely, the first random access response and the downlink data of the second UE are received at different frequency bands at the first point of time. Further, the second random access response and the downlink data of the third UE are received at different frequency bands at the second point of time.

Further, the optimal beam of the first UE, the optimal beam of the second UE, and the optimal beam of the third UE are adjacent to each other.

Further, the first random access response and the second random access response are combined during the predetermined time after the third point of time when the random access preamble is transmitted. Namely, if the random access response was received during the predetermined time, the first UE may know that the random access response received during the predetermined time is the random access response for the random access preamble transmitted by the first UE.

Further, the first random access response and the second random access response include the same information. Since the first random access response and the second random access response have the same information, the first UE may combine those random access responses so as to be decoded.

Further, the first point of time and the second point of time are included in the predetermined time. Namely, the first UE may receive the first random access response and the second random access response during the predetermined time and combine the two random access responses so as to be decoded.

Further, the first random access response and the second random access response may be combined, and thus the first random access response and the second random access response may be masked with the same temporary identifier.

The temporary identifier is determined based on the index of the preamble group including the random access preamble, the index of the subframe in which the random access preamble is transmitted, and the index of the subcarrier in which the random access preamble is transmitted. The first UE knows the random access preamble transmitted by the first UE and time and frequency resources at which the random access preamble has been transmitted, and thus the UE may predict the temporary identifier of the random access response to be received by the UE.

The preamble group corresponds to the optimal beam of the first UE. Respective sub-array beams may be mapped with different preamble groups, or a multitude of sub-array beams may be mapped with one preamble group. As such, the base station may recognize the sub-array beam (optimal beam) desired by the UE depending on the preamble group to which the received preamble belongs.

There are two major types of schemes for combining the first random access response with the second random access response. One of them is a chase-combining scheme and the other is an incremental redundancy (IR) combining scheme.

The chase combining is applicable when the first random access response and the second random access response are transmitted using the same encoding rate. LLR (log-likelihood ratio) obtained after decoding the first random access response (symbol de-mapping) and LLR obtained after decoding the second random access response are added in the receiving end, and the result value is used as the input value in the decoder. For example, when the first random access response is "information bit+parity bit 1" and the second random access response is "information bit+parity bit 1", the input value may become "combined information bit+combined parity bit 1". Here, the information bit may correspond to systematic data.

The IR combining is possible when the first random access response and the second random access response have different encoding rates, or even if the encoding rates are the same, when the different parity bits are transmitted. In the receiving end, the information bit of the first random access response and the information bit of the second random access response are combined in the same manner as the chase combining. However, the parity bit is concatenated and inputted to the decoder. For example, when the first random access response is "information bit+parity bit 1" and the second random access response is "information bit+ parity bit 2", the input value being inputted into the decoder may become "combined information bit+parity bit 1+parity bit 2".

The first UE transmits the uplink data to the base station based on scheduling information included in the message. The uplink data may include the control signal of L2/L3 layer, RRC control signal, and the like as well as the data of a general application layer. For example, the header of L2/L3 layer, buffer state information, and UE identifier information for collision resolution of the random access procedure may be included in the uplink data.

The scheduling information includes information for the fourth point of time at which the uplink data is transmitted. The information on the fourth point of time is determined based on the third point of time when the random access preamble is transmitted. The point of time may correspond to a subframe. Namely, the message combined with the random access responses includes information indicating the subframe index of the subframe in which uplink data is transmitted. Further, the first random access response and the second random access response should include the same information, and thus the scheduling information is determined on the basis of the point of time when the random access preamble is transmitted.

Further, if the message is transmitted through the control channel, the information on the fourth point of time is set as the UE-common information. In the case of the UE-common information, all the points of time when the first UE, the second UE, and the third UE transmit uplink data may be the same. Namely, since the information on the fourth point of time when the uplink data is transmitted is the same, the signaling overhead of the random access response may be reduced.

If the message is transmitted through the data channel, the information on the fourth point of time is set as the UE-specific information. In the case of the UE-specific information, the points of time when the first UE, the second UE, and the third UE transmit uplink data may be different. Namely, the information on the fourth point of time when the uplink data is transmitted is different, thereby enhancing the scheduling degree of freedom of the base station.

The first UE may receive, from the base station, a beam reference signal (BRS) which is multiplexed in a frequency division multiplex (FDM) scheme for each symbol and is transmitted during at least one subframe. The optimal beam of the first user equipment is determined based on the BRS.

The first UE may receive, from the base station, a primary synchronization single (PSS) or secondary synchronization signal (SSS) that is multiplexed in the FDM scheme together with the BRS for each symbol and is transmitted during the at least one subframe. The first UE may perform a time synchronization by using the PSS or the SSS.

In another aspect, a first user equipment (UE) for transmitting uplink data in a wireless communication system is provided. First, with respect to terms, the optimal beam of a UE may correspond to a sub-array beam or analog beam which is appropriate for the UE. The first user equipment includes a radio frequency (RF) unit transmitting and receiving a wireless signal, and a processor which is operatively connected to the RF unit.

First, the processor transmits a random access preamble to the base station through the optimal beam of the first UE.

The processor receives a first random access response and a second random access response. The first random access response is received together with the downlink data of the second UE through the optimal beam of the second UE at the first point of time. The second random access response is received together with the downlink data of the third UE through the optimal beam of the third UE at the second point of time.

The processor decodes a message which is generated by combining the first random access response with the second random access response.

The first point of time and the second point of time may be the same point of time or different points of time. If the first point of time and the second point of time are the same, the first random access response and the second random access response may correspond to different sub-arrays. When the first point of time and the second point of time are different from each other, the first point of time and the second point of time may correspond to each subframe. Namely, the first UE may receive the random access response twice at different points of time and combine the received random access responses so as to be decoded. There are not many contents in the random access response, and thus if the random access response is transmitted to the entire band for the corresponding beam, resources may be wasted. Hence, the first UE does not receive the random access response as the optimal beam of the first UE. Rather, the first UE may receive the random access response together with the downlink data of another UE (yet, it is assumed that they are beams adjacent to each other) by dividing the frequency band. The first UE receives the random access response several times in order to reinforce the signal-weakened random access response because the random access response is not received as the optimal beam of the first UE. Namely, the first UE receives the random access response until the receiving SNR becomes sufficient.

Namely, the first random access response and the downlink data of the second UE are received at different frequency bands at the first point of time. Further, the second random access response and the downlink data of the third UE are received at different frequency bands at the second point of time.

Further, the optimal beam of the first UE, the optimal beam of the second UE, and the optimal beam of the third UE are adjacent to each other.

Further, the first random access response and the second random access response are combined during the predetermined time after the third point of time when the random access preamble is transmitted. Namely, if the random access response was received during the predetermined time, the first UE may know that the random access response received during the predetermined time is the random access response for the random access preamble transmitted by the first UE.

Further, the first random access response and the second random access response include the same information. Since the first random access response and the second random access response have the same information, the first UE may combine those random access responses so as to be decoded.

Further, the first point of time and the second point of time are included in the predetermined time. Namely, the first UE may receive the first random access response and the second random access response during the predetermined time and combine the two random access responses so as to be decoded.

Further, the first random access response and the second random access response may be combined, and thus the first random access response and the second random access response may be masked with the same temporary identifier.

The temporary identifier is determined based on the index of the preamble group including the random access preamble, the index of the subframe in which the random access preamble is transmitted, and the index of the subcarrier in which the random access preamble is transmitted. The first UE knows the random access preamble transmitted by the first UE and time and frequency resources at which the random access preamble has been transmitted, and thus the UE may predict the temporary identifier of the random access response to be received by the UE.

The preamble group corresponds to the optimal beam of the first UE. Respective sub-array beams may be mapped with different preamble groups, or a multitude of sub-array beams may be mapped with one preamble group. As such, the base station may recognize the sub-array beam (optimal beam) desired by the UE depending on the preamble group to which the received preamble belongs.

There are two major types of schemes for combining the first random access response with the second random access response. One of them is a chase-combining scheme and the other is an incremental redundancy (IR) combining scheme.

The chase combining is applicable when the first random access response and the second random access response are transmitted using the same encoding rate. LLR (log-likelihood ratio) obtained after decoding the first random access response (symbol de-mapping) and LLR obtained after decoding the second random access response are added in the receiving end, and the result value is used as the input value in the decoder. For example, when the first random access response is "information bit+parity bit 1" and the second random access response is "information bit+parity bit 1", the input value may become "combined information bit+combined parity bit 1". Here, the information bit may correspond to systematic data.

The IR combining is possible when the first random access response and the second random access response have different encoding rates, or even if the encoding rates are the same, when the different parity bits are transmitted. In the receiving end, the information bit of the first random access response and the information bit of the second random access response are combined in the same manner as the chase combining. However, the parity bit is concatenated and inputted to the decoder. For example, when the first random access response is "information bit+parity bit 1" and the second random access response is "information bit+parity bit 2", the input value being inputted into the decoder may become "combined information bit+parity bit 1+parity bit 2".

The processor transmits the uplink data to the base station based on scheduling information included in the message. The uplink data may include the control signal of L2/L3 layer, RRC control signal, and the like as well as the data of a general application layer. For example, the header of L2/L3 layer, buffer state information, and UE identifier information for collision resolution of the random access procedure may be included in the uplink data.

The scheduling information includes information for the fourth point of time at which the uplink data is transmitted. The information on the fourth point of time is determined based on the third point of time when the random access preamble is transmitted. The point of time may correspond to a subframe. Namely, the message combined with the random access responses includes information indicating the subframe index of the subframe in which uplink data is transmitted. Further, the first random access response and the second random access response should include the same information, and thus the scheduling information is determined on the basis of the point of time when the random access preamble is transmitted.

Further, if the message is transmitted through the control channel, the information on the fourth point of time is set as the UE-common information. In the case of the UE-common information, all the points of time when the first UE, the second UE, and the third UE transmit uplink data may be the same. Namely, since the information on the fourth point of time when the uplink data is transmitted is the same, the signaling overhead of the random access response may be reduced.

If the message is transmitted through the data channel, the information on the fourth point of time is set as the UE-specific information. In the case of the UE-specific information, the points of time when the first UE, the second UE, and the third UE transmit uplink data may be different. Namely, the information on the fourth point of time when the uplink data is transmitted is different, thereby enhancing the scheduling degree of freedom of the base station.

The processor may receive, from the base station, a beam reference signal (BRS) which is multiplexed in a frequency division multiplex (FDM) scheme for each symbol and is transmitted during at least one subframe. The optimal beam of the first user equipment is determined based on the BRS.

The processor may receive, from the base station, a primary synchronization single (PSS) or secondary synchronization signal (SSS) that is multiplexed in the FDM scheme together with the BRS for each symbol and is transmitted during the at least one subframe. The processor may perform a time synchronization by using the PSS or the SSS.

Advantageous Effects of Invention

If the proposed scheme is used, in a communication system having an analog beamforming applied thereto, operation is possible even when an UE transmits a random access preamble (message 1) N times or the UE receives a random access response (message 2) M times. Further, a random access procedure may be performed faster than the existing repetitive transmission scheme by transmitting a random access preamble N times in a random access subframe. Further, resources can be efficiently used by transmitting a random access response together at the time of transmitting downlink data of another UE.

BRIEF DESCRIPTION OF DRAWINGS

FIG. 1 illustrates the structure of a wireless frame in a 3GPP LTE.

FIG. 2 illustrates a resource grid for one uplink slot in a 3GPP LTE.

FIG. 3 illustrates an example of the structure of a downlink subframe in a 3GPP LTE.

FIG. 4 illustrates an example of an antenna array-based antenna structure and a single beam.

FIG. 5 illustrates an example of an antenna array-based antenna structure and a multi-beam.

FIG. 6 illustrates the configuration of a hybrid beamforming-based system to which an embodiment of the present specification is applicable.

FIG. 7 illustrates a wide width beam by using a multitude of narrow width beams.

FIG. 8 illustrates an example of the structure of a synchronization subframe including a synchronization signal and BRS according to an embodiment of the present specification.

FIG. 9 illustrates an example of a random access subframe composed of a plurality of random access channels according to an embodiment of the present invention.

FIG. 10 illustrates an example of a random access procedure by using a beam scanning according to an embodiment of the present invention.

FIG. 11 is a flowchart showing the procedure of transmitting uplink data using a beam scanning according to an embodiment of the present specification.

FIG. 12 is a block diagram showing a device in which an embodiment of the present specification is implemented.

MODE FOR THE INVENTION

The technology below may be used for various wireless communication systems such as CDMA (code division multiple access), FDMA (frequency division multiple access), TDMA (time division multiple access), OFDMA (orthogonal frequency division multiple access), and SC-FDMA (single carrier-frequency division multiple access). The CDMA may be implemented with a radio technology such as a UTRA (Universal Terrestrial Radio Access) or CDMA 2000. The TDMA may be implemented with radio technologies such as GSM (Global System for Mobile communications)/GPRS (General Packet Radio Service)/EDGE (Enhanced Data Rates for GSM Evolution). The OFDMA may be implemented with radio technologies such as IEEE 802.11 (Wi-Fi), IEEE 802.16 (WiMAX), IEEE 802-20, and E-UTRA (Evolved UTRA). The UTRA is a part of UMTS (Universal Mobile Telecommunications System). 3GPP ($3^{rd}$ Generation Partnership Project) LTE (long term evolution) is a part of E-UMTS (Evolved UMTS) which uses E-UTRA and employs OFDMA in the downlink and employs SC-FDMA in the uplink. The description centers on 3GPP LTE/LTE-A for clarity, but the technical idea of the present invention is not limited thereto.

FIG. 1 illustrates the structure of a wireless frame in a 3GPP LTE.

Referring to FIG. 1, a radio frame is composed of 10 subframes, and one subframe is composed of 2 slots. Slot numbers 0 to 19 are given to slots within a radio frame. Time that takes in transmitting one subframe is called TTI (transmission time interval). The TTI may be understood as a scheduling unit for data transmission. For example, the length of one wireless frame may be 10 m, the length of one subframe may be 1 ms, and the length of one slot may be 0.5 ms.

The structure of a wireless frame is merely an example, and the number of subframes included in the wireless frame and the number of slots included in a subframe may be variously changed.

FIG. 2 illustrates a resource grid for one uplink slot in a 3GPP LTE.

Referring to FIG. 2, an uplink slot includes a plurality of SC-FDMA symbols in the time domain and includes $N_{ul}$ resource blocks (RBs) in the frequency domain. The SC-FDMA symbol is used to express one symbol period and may be understood as an OFDMA symbol or a symbol section. The resource block includes a plurality of subcarriers in resource allocation units in the frequency domain. The number $N_{ul}$ of resource blocks included in the uplink slot is dependent on the uplink transmission bandwidth which is set in the cell. The uplink transmission bandwidth is system information. The UE may know $N_{ul}$ by obtaining the system information.

Each element on the resource grid is called a resource element. The resource element on the resource grid may be identified by index pairs (k, l) within the slot. Here, k (k=0, . . . , $N_{ul}×12-1$) is a subcarrier index within the frequency domain and l (l=0, ..., 6) is SC-FDMA symbol index within the time domain.

Here, one resource block illustrates an example of including 7 SC-FDMA symbols in the time domain and 7×12 resource elements composed of 12 subcarriers in the frequency domain, but the number of subcarriers and the number of SC-FDMA symbols within the resource block are not limited thereto. The number of SC-FDMA symbols or the number of subcarriers, which are included in the resource block, may be changed in various manners. The number of SD-FDMA symbols may be changed depending on the length of CP (cyclic prefix). For example, in the case of the normal CP, the number of SC-FDMA symbols is 7, and in the case of the extended CP, the number of SC-FDMA symbols is 6.

In 3GPP LTE of FIG. 2, the resource grid for one uplink slot may also be applied to the resource grid for the downlink slot. Yet, the downlink slot includes a plurality of OFDM (orthogonal frequency division multiplexing) symbols in the time domain.

FIG. 3 illustrates an example of the structure of a downlink subframe in a 3GPP LTE.

Referring to FIG. 3, a downlink subframe includes 2 consecutive slots. The maximum 3 OFDM symbols prior to the first slot within the downlink subframe become the control region having PDCCH (physical downlink control channel) allocated thereto, and the rest of the OFDM symbols becomes the data region having PDSCH (physical downlink shared channel) allocated thereto. Control channels such as PCFICH (physical control format indicator channel) and PHICH (physical hybridARQ indicator channel) as well as PDCCH may be allocated to the control region. Here, the point that the control region includes 3 OFDM symbols is merely an example. The number of OFDM symbols, which the control region within the subframe includes, may be known through the PCFICH. The PHICH carries information of HARQ (hybrid automatic repeat request) ACK (acknowledgement)/NACK (not-acknowledgement) in response to the uplink data transmission.

The PDCCH may carry a downlink grant which indicates the resource allocation of the downlink transmission on the PDSCH. The UE may read downlink user data which is transmitted through the PDSCH by decoding control information which is transmitted through the PDCCH. Further, the PDCCH may carry control information that is used for PUSCH (physical uplink shared channel) scheduling to the UE. The control information used for PUSCH scheduling is an uplink grant indicating the resource allocation of the uplink transmission.

The control region is composed of a set of a plurality of CCEs (control channel elements). The PDCCH is transmitted to an aggregation of one or a few consecutive CCEs. The CCE corresponds to a plurality of resource element groups. The resource element group is used to define a control channel mapping as a resource element. In the downlink subframe, if the total number of CCEs is Ncce, CCE indexes of 0 to Ncce,k−1 are given in the CCE. Since the number of OFDM symbols, which the control region within the subframe includes, may be changed per subframe, the total number of CCEs within the subframe may also be changed per subframe.

Hereinafter, a beamforming technology will be described.

A beamforming may be divided into a transmitting beamforming performed in a transmitting end and a receiving beamforming performed in a receiving end. The transmitting beamforming generally concentrates the reaching area of the electric wave in a specific direction using a multitude of antennas, thereby increasing directivity. At this time, the form in which a multitude of antennas are aggregated is called an antenna array, and each antenna included in the antenna array may be called an array element. The antenna array may be configured with various forms such as a linear array and a planar array. Further, if the transmitting beamforming is used, the signal directivity is enhanced, through which the transmitted distance of the signal also increases. Furthermore, the signal is rarely transmitted in a direction other than the intended direction, and thus the signal interference on another receiving end is significantly reduced in the receiving end.

The receiving end may perform the beamforming for a receiving signal using a receiving antenna array. The receiving beamforming concentrates the reception of an electric wave in a specific direction so as to increase the sensitivity of the signal received in the specific direction, and excludes a signal incoming from a direction other than the specific direction from the received signals, thereby providing a gain of blocking an interference signal.

FIG. 4 illustrates an example of an antenna array-based antenna structure and a single beam.

Referring to FIG. 4, one RF (Radio Frequency) beam (single beam) is defined using one antenna array including two sub-arrays. At this time, one sub-array is composed of 8(H)*8(V)*2(P) antennas (P denotes Xpol) and includes 2 RF chains. Further, the width of one RF beam is 15'(H)*15' (V).

FIG. 5 illustrates an example of an antenna array-based antenna structure and a multi-beam.

Referring to FIG. 5, a RF beam (multi beam) having different directions per RF chain is defined. In this case, 4 beams according to each RF chain may cover different regions.

When a beam scanning is performed using the single beam or the multi beam, there are advantages and disadvantages as Table 1.

TABLE 1

|  | Single beam | Multi beam |
| --- | --- | --- |
| Advantage | Higher beam gain | Faster beam scanning |
| Disadvantage | Slower beam scanning | Lower beam gain |

FIG. 6 illustrates the configuration of a hybrid beamforming-based system to which an embodiment of the present specification is applicable.

Referring to FIG. 6, a hybrid beamforming-based system 600 may include a transmitter 610 and a receiver 620. The transmitter 610 is equipped with a predetermined number of antenna arrays 616 in order to form each MIMO channel. It is assumed that the total number of the antenna arrays 616-1, 616-2, ..., 616-n is n for the convenience of description. Each of the antenna arrays 616-1, 616-2, ..., 616-n is composed of a predetermined number of antenna elements. Here, the case that the numbers of antenna elements forming respective antenna arrays are the same is illustrated, but each antenna array may be configured with a different number of antenna elements. The receiver 620 may also be equipped with antenna arrays 622-1, 622-2, ..., 622-m which are configured in the same manner as the antenna arrays of the transmitter 610. Here, it is assumed that the total number of the antenna arrays 622 of the receiver 620 is m. the m and n are natural numbers equal to or greater than 1, respectively, and may be set to the same number or different numbers depending on the embodiment.

It is illustrated that the transmitter 610 is equipped with an MIMO encoder 612 and a precoder 614 for encoding and precoding a signal to be transmitted, and the receiver 620 is equipped with a base band combiner 624 and a MIMO decoder 626 for combining and decoding a signal received through the antenna array 622. The transmitter 610 and the receiver 620 are illustrated in a schematic form for the convenience of description, and thus it is possible to have more detailed configurations.

In the aforementioned hybrid beamforming-based communication system, when the transmitter transmits a multitude of signals to a multi-user or a single user (hereinafter, "multiplex transmission"), channel-related information, which is fed back through the receiver, may be utilized for various purposes. For example, as a precoding scheme based on the aforementioned channel-related information is applied at the time of the multiplexing transmission, the interference between signals of the single user or the interference between a multiple of users may be reduced. Accordingly, the transmitter can increase the transmission capacity of the system.

In the hybrid beamforming-based communication system, a case that the frequency division duplexing (FDD) is used is assumed. In this case, if the receiver receives a reference signal from the transmitter, channel information between the transmitter and the receiver may be estimated using the received reference signal. Further, the estimated channel information is fed back to the transmitter. For example, in the case of the LTE-Advanced system, the feedback of the estimated channel information is called a PMI (Precoding Matrix Indicator) feedback. Further, the PMI, which is fed back from the receiver, is used when the transmitter forms a precoding matrix on the receiver. Specifically, the transmitter and the receiver store the precoding matrix in advance, and the PMI indicates one of the precoding matrixes.

Further, the receiver may be set to further transmit a CQI (Channel Quality Indicator), etc. so that the transmitter may be used for the scheduling, MCS (Modulation and Coding Scheme) selection and the like based thereon.

When the hybrid beamforming-based system 600 operates in a millimeter wave band, the antenna form factor becomes very small due to the high frequency band. Hence, the configuration of the beamforming system using a plurality of array antennas becomes very easy. The beamforming in such a millimeter wave band may change the beam direction in a desired direction by applying a different phase shift value to each array antenna element. Further, in order to compensate for a high path loss in the millimeter wave band, each antenna element may be arranged to have a narrow beam width.

As such, a hybrid beamforming-based communication as illustrated in FIG. 6 is different from the existing MIMO system in aspect of forming a beam using an antenna array.

Specifically, when the hybrid beamforming-based communication system for multiusers is configured, if the increase of the number of equipped antenna arrays makes the beam of each antenna array sharp, the difference in the valid channel gain value for the corresponding antenna becomes large. For example, assuming the communication in the form of a BDMA (Beam Division Multiple Access) transmitting a signal for only one user, the gain of the valid channel for the antenna corresponding to the single beam has a value much higher than that of the rest of the antennas, and the gain of the valid channel for each of the rest of the antennas become close to 0.

Meanwhile, as an example of the existing wireless communication standards, in LTE-Advanced, a code book based on a unitary matrix is used for the PMI feedback. In the unitary matrix, the deviation of the channel gain is not large and the characteristic is uniform.

Further, in the hybrid beamforming-based communication system 600, the UE selects an analog beam corresponding to a beam formed by a physical antenna using a BRS (Beam Reference Signal) and selects the best digital beam using the code book. The digital beam may correspond to a digital precoder. The UE may feedback the selected analog beam and the digital beam to the base station, and the base station may perform a beamforming to the UE using the analog beam and the digital beam. The analog beam is rough, has a wide beam width, and slowly changes. The digital beam is precise, has a narrow beam width, and changes fast. Hence, in the hybrid beamforming-based communication system 600, a sharp final beam may be obtained.

FIG. 7 illustrates a wide width beam by using a multitude of narrow width beams.

When a multi-beam illustrated in FIG. 5 is appropriately positioned, a wide width beam may be shown as FIG. 7.

FIG. 7 shows a wide width beam by utilizing 4 sub-arrays. It is assumed in the present specification that a synchronization signal is transmitted using the wide width beam. Namely, it is assumed that all sub-arrays transmit the same PSS (Primary Synchronization Signal)/SSS (Secondary Synchronization Signal)/PBCH (Physical Broadcast Channel). Meanwhile, a multitude of beams are defined to cover a wide area, the beam gain becomes small. A power gain may be additionally provided to the time axis through repetitive transmission. The synchronization subframe structure based on such a repetitive transmission may be shown as FIG. 8.

FIG. 8 illustrates an example of the structure of a synchronization subframe including a synchronization signal and BRS according to an embodiment of the present specification.

FIG. 8 shows the structure of a synchronization subframe and defines PSS/SSS/PBCH. At this time, the block indicated by the same shadow means the OFDM symbol group to which the same RF beam group (defined using 4 sub-array beams) is applied. Namely, the 4 OFDM symbols use the same multi-RF beam.

Hereinafter, a synchronization subframe including a synchronization signal and a BRS (Beam Reference Signal) will be specifically described.

A reference signal such as CSI (Channel State Indicator)-RS (Reference Signal) is separately transmitted in a time division multiplexing (TDM) scheme, a frequency division multiplexing (FDM) scheme, or a code division multiplexing (CDM) scheme for a multitude of beams supported by the base station. In the CSI-RS, the radiation angle of the beam for each antenna port is about 120 degrees, which is considered wide. Yet, the BRS applicable in the embodiment of the present specification is a reference signal for the feedback of the beam state information for a plurality of beams. The BRS has relatively a small beam radiation angle compared to the CSI-RS, thereby being applicable to a sharp beam. Further, the BRS may be multiplexed in the FDM scheme per antenna port in one symbol, and thus the BRS may be transmitted at least during one subframe.

The subframe transmitting the BRS may be called a synchronization subframe. The synchronization subframe has 12 or 14 symbols and may be transmitted according to the transmission period in which one synchronization subframe is transmitted per 5 ms. Here, it is assumed that the synchronization subframe has 14 symbols (2 slots) in consideration of the case of a normal CP. The symbol may correspond to the OFDM symbol.

The UE obtains a downlink synchronization using PSS and/or SSS and selects an optimal beam using the BRS. Referring to FIG. 8, a synchronization signal such as PSS and/or SSS occupies relatively a small band on the basis of a central frequency. In contrast, the BRS has an advantage that a search for an optimal beam is possible on the basis of a broadband channel.

Further, the PSS and/or SSS is multiplexed in the FDM scheme in one symbol. Further, the BRS is also multiplexed with a synchronization signal such as the PSS and/or SSS in the FDM scheme in one symbol. In the case of the millimeter wave band, a sharp beam is used, and thus in order to cover an area where the beam radiation angel is 120 degrees, the synchronization subframe as FIG. 8 may be used.

Further, the PBCH may also be multiplexed together with the BRS in the FDM scheme so as to be transmitted as FIG. 8. The PBCH is a signal for transmitting core information of the system (e.g., a system frame number, a BRS transmission period configuration, an ePBCH transmission indicator, etc.).

Hereinafter, a scheme of performing a random access procedure using a multitude of narrow width beams will be described.

FIG. 9 illustrates an example of a random access subframe composed of a plurality of random access channels according to an embodiment of the present invention.

A UE performs a random access in a random access frame. The random access frame is composed of a plurality of random access channels. FIG. 8 shows an example of a case that each random access channel is composed of 2 OFDM symbols. Further, in FIG. 9, #0 to #6 are indexes of the random access channel and correspond to #0 to #6 of the synchronization subframe, respectively. If the base station receives a random access preamble transmitted by the UE at random access channel #0, the UE may recognize that the sub-array beam is one of sub-array beams within #0 of the synchronization subframe.

The operation of the UE for performing this is as follows. The UE performing a random access performs synchronization in advance in the synchronization subframe and selects a sub-array beam which is appropriate for the UE. Namely, the UE selects a sub-array beam which is appropriate for the UE through a BRS which is received in the synchronization subframe. Further, the time synchronization may be performed using the PSS or SSS which is received in the synchronization subframe. Thereafter, a random access is performed through a random access channel corresponding to a sub-array beam selected by the UE in the random access subframe corresponding to the synchronization subframe. The base station recognizes a beam which is appropriate for the UE by receiving a random access preamble transmitted by the UE.

In the 3GPP LTE system, the random access procedure was designed under the assumption that the beam may reach the entire area in the sector. However, as the analog beamforming is introduced, an area which a beam reaches at one point of time is merely a partial area within the sector, and thus there may be a problem in the case of using the existing random access procedure. For example, in a system having an analog beam applied thereto, although the base station has received the random access preamble at the same time, if the analog beam corresponding to the received random access preamble (i.e., the sub-array beam) is different, message 2 should be transmittable to the UE at different points of time. This is because if the analog beam is applied, the same beam is applied to the entire bands, and thus at the time of transmitting data, the beam direction should be determined in consideration of another downlink data transmission as well as message 2.

The random access procedure proposed in the present specification is composed of massage 1 to message 4. Message 1, which is the first step, is a random access preamble that is transmitted by the UE to the base station. Message 2 is a response signal (random access response) transmitted by the base station to the UE. Message 3 is a signal which the UE transmits to the base station using the scheduling information of message 2. Message 4 is a response signal which the base station sends to the UE, and if the reception of message 4 is terminated, the contention resolution is completed.

Hereinafter, a random access procedure using a beam scanning will be described

It is assumed that the beam-scanning unit of a synchronization subframe (beam-scanning subframe) is X OFDM symbols and Y sub-array beams exist in X OFDM symbols. It is assumed that the random access channel corresponding to the nth beam-scanning channel of the synchronization subframe is the nth random access channel of the random access subframe. If the base station receives a random access preamble transmitted by the UE in the nth random access channel, the base station may know that the beam preferred by the UE is one of Y sub-array beams. Furthermore, different preamble groups for respective sub-array beams may be allocated in order to clearly indicate the sub-array beam most preferred by the UE among Y sub-array beams. In this case, the base station may recognize the sub-array beam desired by the UE depending on the group to which the received preamble belongs. Alternatively, it is possible to select one of Y sub-array beams as the optimal beam by measuring the signal size of Rx antenna ports received by the base station.

For example, the base station determines a temporary identifier, which is masked when message 2 is transmitted, depending on the preamble group index, time (subframe) index, and frequency (subcarrier) index. The UE knows the preamble, the time resource, and the frequency resource having been used at the time of transmitting message 1, and thus the UE can predict a temporary identifier of message 2 to be received by the UE.

The optimal beam may be a beam which is located between sub-array beam #3 of the nth beam scanning and sub-array beam #0 of the n+1th beam scanning. This means that the Tx/Rx beam gain, which is obtained from sub-array beam #3 of the nth beam scanning and sub-array beam #0 of the n+1th beam scanning, may be lower than the gain of another UE. At this time, only when the UE transmits message 1 twice on the nth random access channel and n+1 random access channel, the case that the base station receives message 1 may occur. In order to recognize the fact that the UE has transmitted a preamble twice, it is necessary to generate a preamble group corresponding to two different sub-array beams. Further, when the UE transmits the preamble twice, the UE needs to set the preamble of the corresponding preamble group to be used.

The UE having transmitted message 1 should be able to receive message 2, and thus a temporary identifier (e.g., RA (Random Access)-RNTI (Radio Network Temporary Identifier)) for message 2 is necessary. As in the above example, a multitude of sub-array beams may be mapped with one preamble group, and thus the present specification proposes a scheme of selecting a temporary identifier of message 2 depending on the preamble group index.

For example, some preamble groups may correspond to the sub-array beam by 1:1, and some preamble groups may correspond to N sub-array beams.

Further, when the sub-array beam of the Lth beam scanning and the sub-array beam of the L'th beam scanning within the beam-scanning subframe are adjacent to each other, the same preamble group may be allocated to two beams (corresponding to the Lth random access channel and the L'th random access channel). Further, the preamble group corresponding to the sub-array beam of the Lth beam scanning and the preamble group corresponding to the sub-array beam of the L'th beam scanning may separately exist. For example, it is assumed that there are #0 to #15 preambles. Preambles used in the Lth random access channel are #0 to #11, and preambles used in the L'th random access channel are also #0 to #11. Further, preambles, which may be used in both the Lth random access channel and the L'th random access channel, are set to #12 to #15.

Further, the mapping relation between the preamble group and the sub-array beam is broadcast within the cell with the upper layer signaling. Namely, all UEs within the cell should know the relation between the preamble group and the sub-array beam, and thus the corresponding information is broadcast within the cell.

FIG. 10 illustrates an example of a random access procedure by using a beam scanning according to an embodiment of the present invention.

For example, after transmitting message 1, the UE attempts the decoding by combining message 2, which is received at different points of time (subframe) during time T. If the decoding succeeds, the UE transmits message 3 from the resource designated by message 2 to message 3.

A random access subframe for transmitting message 1 separately exists, but a subframe for transmitting message 2 to message 4 does not separately exist. Hence, message 2 to message 4 are transmitted in a general subframe for data transmission.

Downlink data and uplink data are also transmitted in the subframe for data transmission, and the direction of the analog beam for transmitting such data may not be one of the directions of the sub-array beam of the beam-scanning subframe. For example, it is assumed that subarray beams #0 to #3 are adjacent to each other. If message 1 is transmitted in the direction of sub-array Rx beam #1 of the base station (S1010), the base station may expect message 2 to be transmitted in the direction of sub-array Tx beam #1. Yet, in the case of the random access response corresponding to message 2, there are not many contents, and thus if the random access response is transmitted to entire bands for the corresponding beam, the resources may be wasted. Particularly in the millimeter wave (mmWave) band, a broadband (wide frequency band) is used, which may cause a greater problem. Hence, the base station may divide the frequency band so as to transmit the random access response at the same point of time as the downlink data.

Referring to FIG. 10, it is assumed that there are UE 2 trying to receive data with the high priority with the beam between sub-array beam #1 and sub-array beam #2 within the cell and UE3 trying to receive data with the high priority with the beam between sub-array beam #0 and sub-array beam #1. In this case, the base station transmits message 2 of UE 1 while sending data with the beam that is optimal to UE2 (S1020), and the base station may transmit message 2 of UE 1 together while sending data with the beam that is optimal to UE 3 (S1030). Namely, UE 1 does not receive message 2 throughout the entire bands with the optimal beam of UE 1 and receives a random access response together with the downlink data for UE 2 with the optimal beam of UE 2 (S1020). Further, UE 1 receives the random access response together with the downlink data for UE 3 with the optimal beam of UE 3 (S1030). In this case, UE 1 does not receive a random access response with the optimal beam, and thus it may not be possible to secure sufficient receiving SNR for the decoding only with one time random access response. Hence, it is necessary to attempt a decoding by combining message 2 which has been received twice.

However, when the UE attempts the decoding by combining message 2, the time for attempting the combination of the UE may need to be restricted. Hence, the base station determines the time range for transmitting message 2 in advance and informs the UE of the determination. Further, the time T for attempting the combination by the UE is set from the point of time when message 1 is transmitted. Namely, the UE may combine the random access response received together with the downlink data for UE 2 with the optimal beam of UE 2 with the random access response received together with the downlink data for UE 3 with the optimal beam of UE 3 during designated time T so as to attempt the decoding (S1040).

Time T may be broadcast in common by the base station within the cell with the upper (L2/L3) layer signaling or may designate a separate value to the individual UE so as to be notified.

Further, message 2 corresponding to the same message 1 may be transmitted several times during time T. Further, even at the one time reception of message 2, it should be self-decodable.

Even in the case that the UE fails to receive the firstly transmitted message 2 and receives only the secondly transmitted message 2, each message 2 is preferably designed to be self-decodable so that the decoding may be attempted. Further, the message 2, which may be coupled, should be masked with the same temporary identifier.

As another example, message 2 includes information (subframe index) on time when message 3 is scheduled. Further, the time information is generated on the basis of the point of time when message 1 is transmitted.

Message 2 includes information of scheduling message 3. In a system to which the analog beamforming has been applied, the area where the data transmission and reception is possible depending on the direction of the analog beamforming is changed, and thus it is difficult to maintain constant the point of time of transmitting message 3 after receiving message 2. Hence, it is necessary to indicate the subframe index of the subframe in which message 3 is transmitted. Further, in order to perform a decoding by combining repeatedly transmitted message 2, messages 2 should have the same information. Hence, it may be necessary for the scheduling time information of message 3 existing within message 2 to be set on the basis of the point of time when the UE transmits message 1.

For example, the scheduling time information of message 3 corresponding to message 2 may UE-commonly exist or may be UE-specifically set. Message 2 may include scheduling information of message 3 for several UEs. Under such assumption, advantages when the scheduling time information of message 3 is UE-commonly set are as follows. A multitude of UEs can transmit uplink data only when the base station performs Rx beamforming in a direction that the corresponding UEs are located, and thus the point of time when different UEs transmit message 3 may be the same subframe. Hence, it is preferred to reduce the signaling overhead of message 2 by integrating time scheduling information of message 3. Accordingly, it may be recognized that the case that the scheduling time information of message 3 is UE-commonly set is appropriate for the case that message 2 is transmitted on the control channel.

Further, the advantages when the scheduling time information of message 3 are UE-specifically set are as follows. When message 2 is transmitted on the data channel, the signaling overhead is not an important issue. Hence, the case that the scheduling time information of message 3 is UE-specifically set is appropriate for the case that message 2 is transmitted on the data channel. At this time, the scheduling degree of freedom of the base station becomes higher than the case that the scheduling time information of message 3 UE-commonly set.

Further, the scheduling time information of message 3 is generated on the basis of the time (subframe index) when message 1 is received. If message 3 has been scheduled during time T' in message 2, the UE transmits message 1 and then transmits message 3 after time T' (S1050).

If the UE has a good receiving SNR (Signal to Noise Ratio), the UE can decode message 2. In this case, in order to remove the unnecessary waiting time, scheduling time information of message 3 included in message 2 may need to be set on the basis of the point of time of transmitting message 1. Message may be received simultaneously by a multitude of UEs as well as a single UE, and thus at this time, UEs having a good receiving SNR and a poor receiving SNR may be together. Hence, it would be advantageous to set UEs having a good SNR to first send a signal.

Further, the scheduling time information of message 3 is generated on the basis of time T. If message 2 to message 3 are scheduled at time T', the UE transmits message 1 and then transmits message 3 at T+T' (S1050). Namely, the UE may receive message 2 during time T and then combine the message 2 so as to perform the decoding, and thus it is preferred that the point of time of transmitting message 3 designated by message 2 is set to be after T.

FIG. 11 is a flowchart showing the procedure of transmitting uplink data using a beam scanning according to an embodiment of the present specification.

First, with respect to terms, the optimal beam of a UE may correspond to a sub-array beam or analog beam which is appropriate for the UE.

First, in step S1110, a first UE transmits a random access preamble to the base station through the optimal beam of the first UE.

In step S1120, the first UE receives a first random access response and a second random access response. The first random access response is received together with the downlink data of the second UE through the optimal beam of the second UE at the first point of time. The second random access response is received together with the downlink data of the third UE through the optimal beam of the third UE at the second point of time.

In step S1130, the first UE decodes a message which is generated by combining the first random access response with the second random access response.

The first point of time and the second point of time may be the same point of time or different points of time. If the first point of time and the second point of time are the same, the first random access response and the second random access response may correspond to different sub-arrays. When the first point of time and the second point of time are different from each other, the first point of time and the second point of time may correspond to each subframe. Namely, the first UE may receive the random access response twice at different points of time and combine the received random access responses so as to be decoded. There are not many contents in the random access response, and thus if the random access response is transmitted to the entire band for the corresponding beam, resources may be wasted. Hence, the first UE does not receive the random access response as the optimal beam of the first UE. Rather, the first UE may receive the random access response together with the downlink data of another UE (yet, it is assumed that they are beams adjacent to each other) by dividing the frequency band. The first UE receives the random access response several times in order to reinforce the signal-weakened random access response because the random access response is not received as the optimal beam of the first UE. Namely, the first UE receives the random access response until the receiving SNR becomes sufficient.

Namely, the first random access response and the downlink data of the second UE are received at different frequency bands at the first point of time. Further, the second random access response and the downlink data of the third UE are received at different frequency bands at the second point of time.

Further, the optimal beam of the first UE, the optimal beam of the second UE, and the optimal beam of the third UE are adjacent to each other.

Further, the first random access response and the second random access response are combined during the predetermined time after the third point of time when the random access preamble is transmitted. Namely, if the random access response was received during the predetermined time, the first UE may know that the random access response received during the predetermined time is the random access response for the random access preamble transmitted by the first UE.

Further, the first random access response and the second random access response include the same information. Since the first random access response and the second random access response have the same information, the first UE may combine those random access responses so as to be decoded.

Further, the first point of time and the second point of time are included in the predetermined time. Namely, the first UE may receive the first random access response and the second random access response during the predetermined time and combine the two random access responses so as to be decoded.

Further, the first random access response and the second random access response may be combined, and thus the first random access response and the second random access response may be masked with the same temporary identifier.

The temporary identifier is determined based on the index of the preamble group including the random access preamble, the index of the subframe in which the random access preamble is transmitted, and the index of the subcarrier in which the random access preamble is transmitted. The first UE knows the random access preamble transmitted by the first UE and time and frequency resources at which the random access preamble has been transmitted, and thus the UE may predict the temporary identifier of the random access response to be received by the UE.

The preamble group corresponds to the optimal beam of the first UE. Respective sub-array beams may be mapped with different preamble groups, or a multitude of sub-array beams may be mapped with one preamble group. As such, the base station may recognize the sub-array beam (optimal beam) desired by the UE depending on the preamble group to which the received preamble belongs.

There are two major types of schemes for combining the first random access response with the second random access response. One of them is a chase-combining scheme and the other is an incremental redundancy (IR) combining scheme.

The chase combining is applicable when the first random access response and the second random access response are transmitted using the same encoding rate. LLR (log-likelihood ratio) obtained after decoding the first random access response (symbol de-mapping) and LLR obtained after decoding the second random access response are added in the receiving end, and the result value is used as the input value in the decoder. For example, when the first random access response is "information bit+parity bit 1" and the second random access response is "information bit+parity bit 1", the input value may become "combined information bit+combined parity bit 1". Here, the information bit may correspond to systematic data.

The IR combining is possible when the first random access response and the second random access response have different encoding rates, or even if the encoding rates are the same, when the different parity bits are transmitted. In the receiving end, the information bit of the first random access response and the information bit of the second random access response are combined in the same manner as the chase combining. However, the parity bit is concatenated and inputted to the decoder. For example, when the first random access response is "information bit+parity bit 1" and the second random access response is "information bit+parity bit 2", the input value being inputted into the decoder may become "combined information bit+parity bit 1+parity bit 2".

In step S1140, the first UE transmits the uplink data to the base station based on scheduling information included in the message. The uplink data may include the control signal of L2/L3 layer, RRC control signal, and the like as well as the data of a general application layer. For example, the header of L2/L3 layer, buffer state information, and UE identifier information for collision resolution of the random access procedure may be included in the uplink data.

The scheduling information includes information for the fourth point of time at which the uplink data is transmitted. The information on the fourth point of time is determined based on the third point of time when the random access preamble is transmitted. The point of time may correspond to a subframe. Namely, the message combined with the random access responses includes information indicating the subframe index of the subframe in which uplink data is transmitted. Further, the first random access response and the second random access response should include the same information, and thus the scheduling information is determined on the basis of the point of time when the random access preamble is transmitted.

Further, if the message is transmitted through the control channel, the information on the fourth point of time is set as the UE-common information. In the case of the UE-common information, all the points of time when the first UE, the second UE, and the third UE transmit uplink data may be the same. Namely, since the information on the fourth point of time when the uplink data is transmitted is the same, the signaling overhead of the random access response may be reduced.

If the message is transmitted through the data channel, the information on the fourth point of time is set as the UE-specific information. In the case of the UE-specific information, the points of time when the first UE, the second UE, and the third UE transmit uplink data may be different. Namely, the information on the fourth point of time when the uplink data is transmitted is different, thereby enhancing the scheduling degree of freedom of the base station.

The first UE may receive, from the base station, a beam reference signal (BRS) which is multiplexed in a frequency division multiplex (FDM) scheme for each symbol and is transmitted during at least one subframe. The optimal beam of the first user equipment is determined based on the BRS.

The first UE may receive, from the base station, a primary synchronization single (PSS) or secondary synchronization signal (SSS) that is multiplexed in the FDM scheme together with the BRS for each symbol and is transmitted during the at least one subframe. The first UE may perform a time synchronization by using the PSS or the SSS.

FIG. 12 is a block diagram showing a device in which an embodiment of the present specification is implemented.

A wireless device 1200 may include a processor 1210, a memory 1220, and a radio frequency (RF) unit 1230.

The processor may be configured to implement the above-described functions, procedures, and methods. The layers of the radio interface protocol may be implemented by the processor. The processor 1210 may perform a procedure for operating the above-described operations. The memory 1220 is operatively connected to the processor 1210, and the RF unit 1230 is operatively connected to the processor 1210.

The processor 1210 may include ASIC (application-specific integrated circuit), other chipsets, a logical circuit and/or a data processing device. The memory 1220 may include a ROM (read-only memory), a RAM (random access memory), a flash memory, a memory card, a storage medium and/or another storage device. The RF unit 1230 may include a baseband circuit for processing a wireless signal. When an embodiment is implemented as software, the above-described scheme may be implemented as a module for performing the above-described functions. The module may be stored in the memory 1220 and may be executed by the processor 1210. The memory 1220 may exist inside or outside the processor 1210 and may be connected to the processor 1210 using various known means.

Various schemes according to the present specification have been described through the drawings and symbols in the drawings based on the above-described examples. The respective schemes have been described using a multitude of steps or blocks according to a specific order for the convenience of description, but the specific order of such steps or blocks do not limit the invention disclosed in claims, and respective steps or blocks may be implemented in different orders or may be performed simultaneously with other steps or blocks. Further, it would be easily understood by one of ordinary skill in the art that each step or block is not limitative and one or more other steps may be added or deleted within the scope of the idea of the present invention.

The above-described embodiments include various examples. One of ordinary skill in the art would know that it is not possible to describe all possible combinations of examples and various combinations may be derived from the technology of the present specification. Hence, the scope of the present invention should be determined on the basis of combinations of various examples disclosed in the detailed description of the invention of the present specification within the scope of the disclosure of the claims below.

The invention claimed is:

1. A method of transmitting, by a first user equipment (UE), uplink data in a wireless communication, the method comprising:

transmitting a random access preamble to a base station through an optimal beam of the first user equipment;

receiving a first random access response and a second random access response, wherein the first random access response is received together with downlink data of a second user equipment through an optimal beam of the second user equipment at a first point of time and wherein the second random access response is received together with downlink data of a third user equipment through an optimal beam of the third user equipment at a second point of time;

decoding a message which is generated by combining the first random access response with the second random access response; and transmitting uplink data to the base station based on scheduling information included in the message, wherein the first random access response and the second random access response are masked with a temporary identifier, and wherein the temporary identifier is determined based on an index of a preamble group including the random access preamble.

2. The method of claim 1, wherein the first random access response and the downlink data of the second user equipment are received at different frequency bands at the first point of time, and wherein the second random access response and the downlink data of the third user equipment are received at different frequency bands at the second point of time.

3. The method of claim 1, wherein the optimal beam of the first user equipment, the optimal beam of the second user equipment, and the optimal beam of the third user equipment are adjacent to each other.

4. The method of claim 1, wherein the first random access response and the second random access response are combined for a predetermined time after a third point of time when the random access preamble is transmitted, wherein the first random access response and the second random access response include same information, and wherein the first point of time and the second point of time are included in the predetermined time.

5. The method of claim 1, wherein the temporary identifier is also determined based on an index of a subframe in which the random access preamble is transmitted, and an index of a subcarrier through which the random access preamble is transmitted.

6. The method of claim 5, wherein the preamble group corresponds to the optimal beam of the first user equipment.

7. The method of claim 1, wherein the scheduling information comprises information on a fourth point of time when the uplink data is transmitted, wherein the information on the fourth point of time is determined based on a third point of time when the random access preamble is transmitted.

8. The method of claim 7, wherein if the message is transmitted through a control channel, the information on the fourth point of time is set as user equipment-common information, and wherein if the message is transmitted through a data channel, the information on the fourth point of time is set as user equipment-specific information.

9. The method of claim 1, further comprising:
receiving, from the base station, a beam reference signal (BRS) which is multiplexed in a frequency division multiplex (FDM) scheme for each symbol and is transmitted during at least one subframe,
wherein the optimal beam of the first user equipment is determined based on the BRS.

10. The method of claim 9, further comprising:
receiving, from the base station, a primary synchronization single (PSS) or secondary synchronization signal (SSS) that is multiplexed in the FDM scheme together with the BRS for each symbol and is transmitted during the at least one subframe; and
performing a time synchronization by using the PSS or the SSS.

11. A first user equipment (UE) for transmitting uplink data in a wireless communication system, the first user equipment comprising:
a radio frequency (RF) unit that transmits and receives a wireless signal; and
a processor which is operatively connected to the RF unit, wherein the processor is configured to:
transmit a random access preamble to a base station through an optimal beam of the first user equipment;
receive a first random access response and a second random access response, wherein the first random access response is received together with downlink data of the second user equipment through an optimal beam of the second user equipment at a first point of time and wherein the second random access response is received together with downlink data of a third user equipment through an optimal beam of the third user equipment at a second point of time;
decode a message which is generated by combining the first random access response with the second random access response; and
transmit uplink data to the base station based on scheduling information included in the message,
wherein the first random access response and the second random access response are masked with a temporary identifier, and
wherein the temporary identifier is determined based on an index of a preamble group including the random access preamble.

12. The first user equipment of claim 11, wherein the first random access response and the downlink data of the second user equipment are received at different frequency bands at the first point of time, and wherein the second random access response and the downlink data of the third user equipment are received at different frequency bands at the second point of time.

13. The first user equipment of claim 11, wherein the first random access response and the second random access response are combined for a predetermined time after a third point of time when the random access preamble is transmitted, wherein the first random access response and the second random access response include same information, and wherein the first point of time and the second point of time are included in the predetermined time.

* * * * *